US012156052B2

(12) United States Patent
Lu et al.

(10) Patent No.: US 12,156,052 B2
(45) Date of Patent: *Nov. 26, 2024

(54) METHOD FOR IDENTIFYING AND DIAGNOSING FAILURES IN PAIRWISE TIME SYNCHRONIZATION AND FREQUENCY CALIBRATION IN A MESH NETWORK

(71) Applicant: ZaiNar, Inc., Redwood City, CA (US)

(72) Inventors: Jonathan Lu, Redwood City, CA (US); Mainak Chowdhury, Redwood City, CA (US); Ophir Sweiry, Redwood City, CA (US); Srdjan Miocinovic, Redwood City, CA (US)

(73) Assignee: ZaiNar, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,914

(22) Filed: Sep. 8, 2023

(65) Prior Publication Data
US 2024/0073708 A1    Feb. 29, 2024

Related U.S. Application Data

(63) Continuation of application No. 17/105,458, filed on Nov. 25, 2020, now Pat. No. 11,785,482.
(Continued)

(51) Int. Cl.
*H04W 24/04* (2009.01)
*H04W 56/00* (2009.01)
*H04W 84/18* (2009.01)

(52) U.S. Cl.
CPC ....... *H04W 24/04* (2013.01); *H04W 56/0035* (2013.01); *H04W 84/18* (2013.01)

(58) Field of Classification Search
CPC .......... G06N 3/047; G06N 3/084; G06N 3/08; G06N 3/045; G06N 3/082; G06F 16/9024; G06F 18/21; G06F 17/16; G06F 17/10; G06F 18/24; G06F 21/56; G06F 21/53; G06V 10/426; G06V 10/82;
(Continued)

(56) References Cited

U.S. PATENT DOCUMENTS 10,742,670 B1 * 8/2020 Kayyoor ................. G06F 21/56
11,182,396 B2 * 11/2021 Rossi .................... G06F 16/248
(Continued)

*Primary Examiner* — Jung Liu
(74) *Attorney, Agent, or Firm* — Run8 Patent Group, LLC; Peter Miller

(57) ABSTRACT

A method includes accessing a network graph including: a set of nodes, each representing a transceiver; and a set of edges, each edge connecting two nodes and representing a communication channel between a pair of transceivers. The method also includes: accessing a network state comprising a set of edge values for the set of edges; and identifying a set of triangle graphs in the network graph. The method further includes, for each triangle graph in the network graph: calculating a component diagnostic score based on a subset of edge values; and for each node in the triangle graph, updating a cumulative diagnostic score for the node based on the component diagnostic score. The method additionally includes, in response to detecting a cumulative diagnostic score for a node exceeding a threshold cumulative diagnostic score, triggering a corrective action at a transceiver represented by the node.

20 Claims, 5 Drawing Sheets

Related U.S. Application Data

(60) Provisional application No. 62/940,722, filed on Nov. 26, 2019.

(58) Field of Classification Search
CPC ............... H04L 63/1441; H04L 45/122; H04L 63/1425; H04L 63/1416; H04L 63/1408
See application file for complete search history.

(56) References Cited

U.S. PATENT DOCUMENTS

| | | | |
|---|---|---|---|
| 11,445,385 B2* | 9/2022 | Gray | H04W 64/003 |
| 11,544,535 B2* | 1/2023 | Lee | G06N 3/047 |
| 2020/0285944 A1* | 9/2020 | Lee | G06F 16/9024 |
| 2023/0043435 A1* | 2/2023 | Gray | H04L 41/0893 |

* cited by examiner

METHOD FOR IDENTIFYING AND DIAGNOSING FAILURES IN PAIRWISE TIME SYNCHRONIZATION AND FREQUENCY CALIBRATION IN A MESH NETWORK

CROSS-REFERENCE TO RELATED APPLICATIONS

This application is a continuation application of U.S. patent application Ser. No. 17/105,458, filed 25 Nov. 2020, which claims the benefit of U.S. Provisional Application No. 62/940,722, filed on 26 Nov. 2019, which is incorporated in its entirety by this reference.

This application is related to U.S. Provisional Application No. 63/105,822, filed on 26 Oct. 2020, U.S. patent application Ser. No. 16/846,030, filed on 10 Apr. 2020, U.S. patent application Ser. No. 16/588,722, filed on 30 Sep. 2019, and U.S. patent application Ser. No. 16/405,922, filed on 7 May 2019, each of which are incorporated in their entireties by this reference.

TECHNICAL FIELD

This invention relates generally to the field of mesh network operation and more specifically to a new and useful method for identifying and diagnosing failures in pairwise time synchronization and pairwise frequency calibration in a mesh network in the field of mesh network operation.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
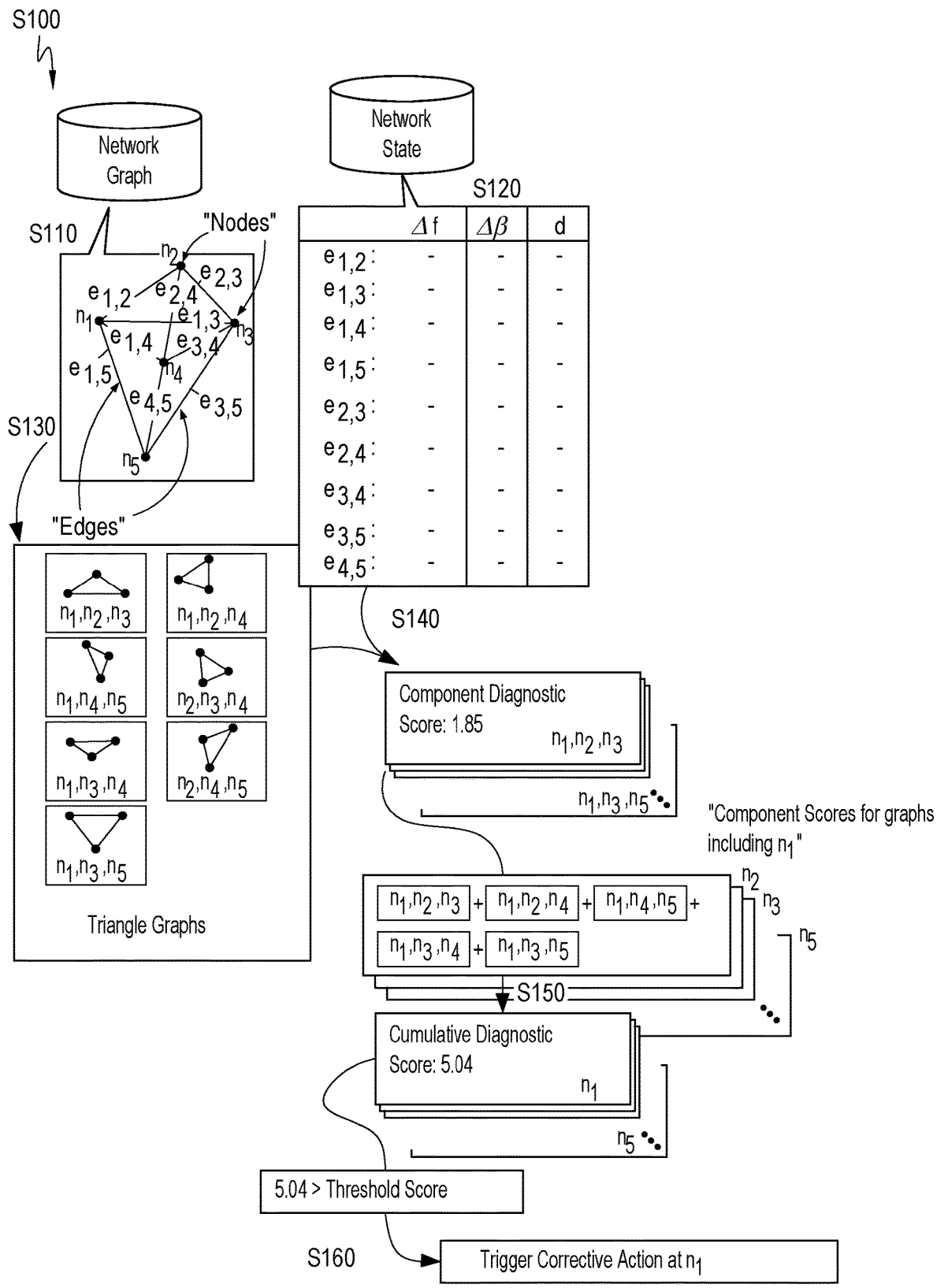
FIG. 1 is a flowchart representation of one variation of a method.

As shown in FIG. 1, a method S100 includes, accessing a network graph in Block S110 including: a set of nodes, each node in the set of nodes representing a transceiver in a network of transceivers; and a set of edges, each edge in the set of edges connecting two nodes in the set of nodes and representing a communication channel between a pair of transceivers in the network of transceivers represented by the pair of nodes. The method S100 also includes: accessing a network state including a set of edge values for the set of edges in Block S120; and identifying a set of triangle graphs in the network graph in Block S130. The method S100 additionally includes, for each triangle graph in the network graph: calculating a component diagnostic score based on a subset of edge values in the set of edge values, the subset of edge values associated with edges in the triangle graph in Block S140; and for each node in the triangle graph, updating a cumulative diagnostic score for the node based on the component diagnostic score in Block S150. The method S100 further includes, in response to detecting a first cumulative diagnostic score for a first node exceeding a threshold cumulative diagnostic score, triggering a corrective action at a first transceiver represented by the first node in Block S160.

Figure 2:
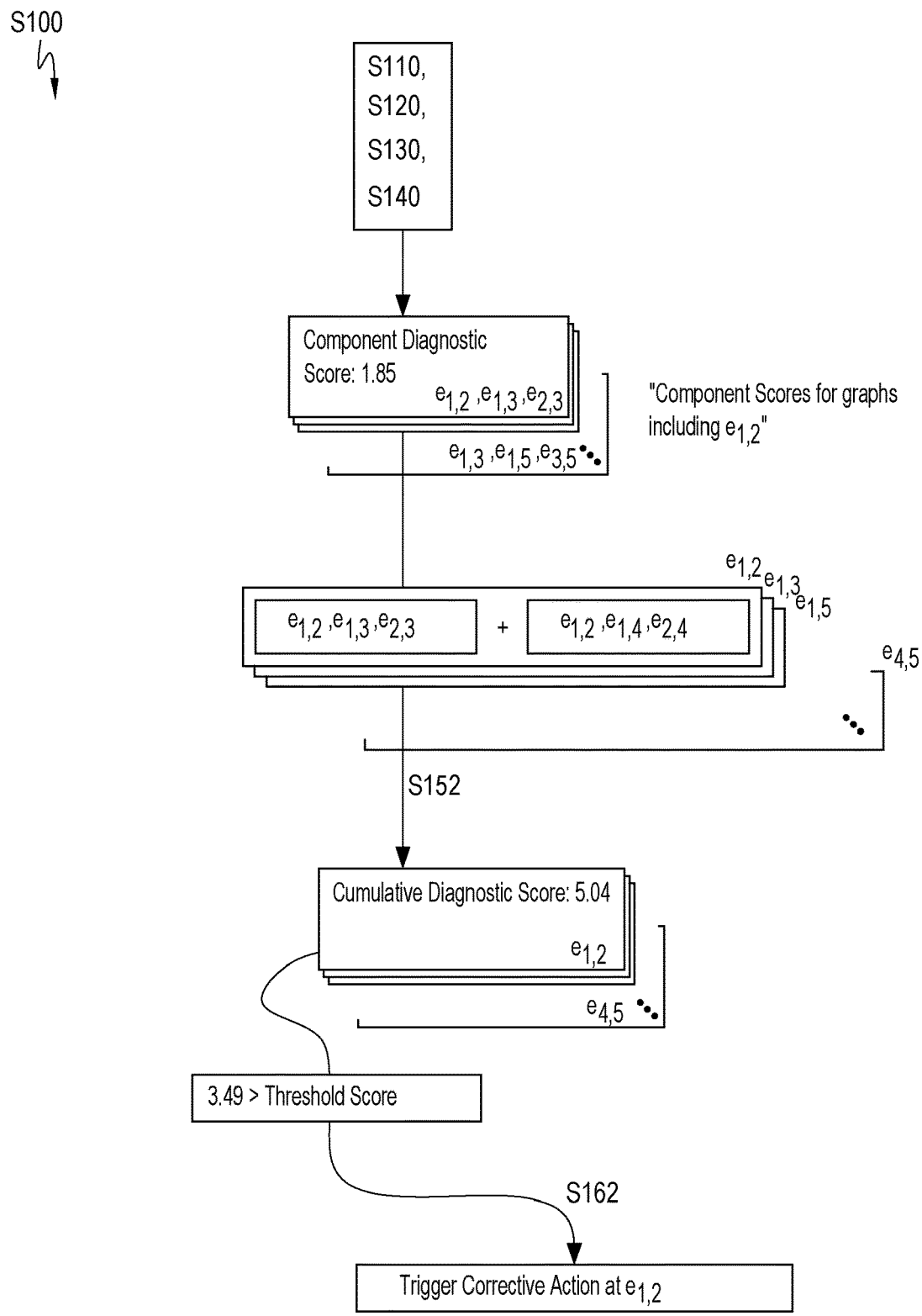
FIG. 2 is a flowchart representation of one variation of the method.

As shown in FIG. 2, one variation of the method S100 includes accessing a network graph in Block S110 including: a set of nodes, each node in the set of nodes representing a transceiver in a network of transceivers; and a set of edges, each edge in the set of edges connecting two nodes in the set of nodes and representing a communication channel between a pair of transceivers in the network of transceivers represented by the pair of nodes. The method S100 also includes: accessing a network state including a set of edge values for the set of edges in Block S120; and identifying a set of triangle graphs in the network graph in Block S130. The method S100 additionally includes, for each triangle graph in the network graph: calculating a component diagnostic score based on a subset of edge values in the set of edge values, the subset of edge values associated with edges in the triangle graph in Block S140; and for each edge in the triangle graph, updating a cumulative diagnostic score for the edge based on the component diagnostic score in Block S152. The method S100 further includes, in response to detecting a first cumulative diagnostic score for a first edge exceeding a first threshold cumulative diagnostic score, triggering a first corrective action at a first communication channel represented by the first edge in Block S162.

Figure 3:
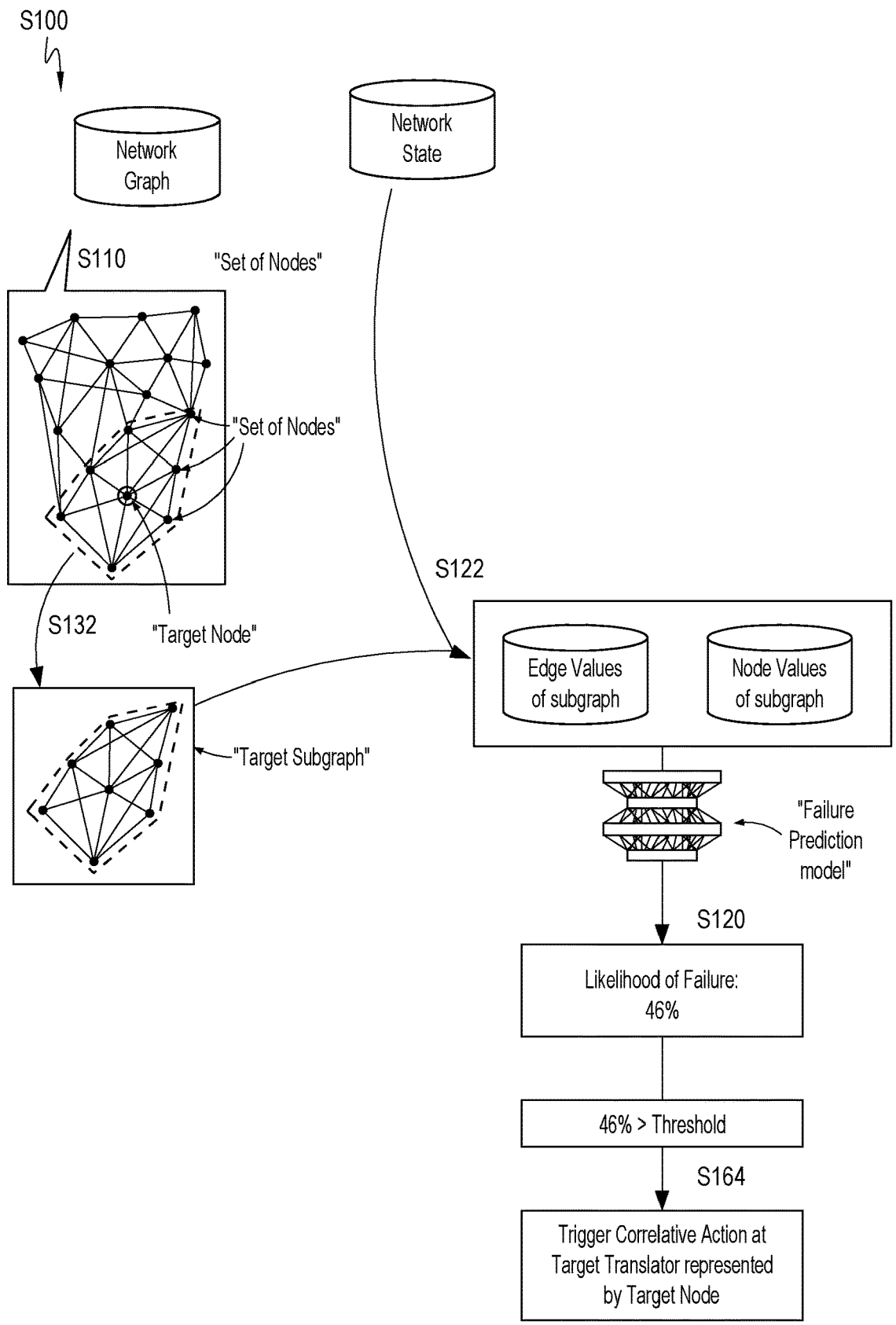
FIG. 3 is a flowchart representation of one variation of the method.

As shown in FIG. 3, one variation of the method S100 includes accessing a network graph in Block S110 including: a set of nodes, each node in the set of nodes representing a transceiver in a network of transceivers; and a set of edges, each edge in the set of edges connecting a pair of nodes in the set of nodes and representing a communication channel between a pair of transceivers in the network of transceivers represented by the pair of nodes. This variation of the method S100 also includes: identifying a target subgraph of the network graph associated with a target node in the set of nodes, the target node representing a target transceiver in Block S132; accessing a target network state of the target subgraph comprising a set of edge values for each edge in the first subgraph, the set of edge values comprising a pairwise time bias associated with each edge in the subgraph and a pairwise frequency offset associated with each edge in the target subgraph in Block S122; calculating a first likelihood of failure of the target transceiver within a threshold period of time based on the target network state of the target subgraph and a failure prediction model in Block S170; and, in response to detecting the first likelihood of failure of the target transceiver exceeding a threshold likelihood, triggering a corrective action at the target transceiver in Block S164.

2. Applications

Generally, the method S100 can be executed by a computer system—such as an individual computer, a computer network, or a set of servers connected over a network (hereinafter "the system")—to monitor clock synchronicity (e.g., frequency offset and time bias) and/or propagation distance between transceivers in a transceiver network and to selectively trigger individual transceivers to resynchronize and/or recalibrate with other transceivers in the network based on identified inconsistencies in reported values of pairwise frequency offsets, pairwise time biases, and/or pairwise distances between the transceivers in the transceiver network. In particular the computer system can: receive pairwise frequency offset, time bias, and/or distance data from a mesh network (i.e. a network) of time-synchronized and self-localizing transceivers; identify inconsistencies in these data; and automatically trigger particular transceivers in the network to recalibrate or resynchronize with other transceivers in the network in order to reduce network-wide inaccuracy in the reference time of the network and/or the calculated relative locations of transceivers in the network.

For example, the mesh network of transceivers can calculate—on a pairwise basis—clock frequency offsets between pairs of transceivers, time biases between pairs of transceivers, and distances between pairs of transceivers in the network. The mesh network can then maintain a reference clock for the set of transceivers (to which the network may be synchronized e.g., to within one nanosecond) and localize these transceivers relative to each other in two- or three-dimensional space (e.g., to within 30 centimeters) based on these pairwise frequency offset, time bias, and distance values. However, small errors in the accuracy of these pairwise frequency-offset, time bias, and distance values originating at a single transceiver—such as due to time and/or frequency domain drift within a transceiver, environmental changes around a transceiver, or degradation of a transceiver's hardware over time—may introduce network-wide errors in the value of the reference clock and the relative locations of the transceivers calculated by the network based on these values.

Additionally, the time-synchronized and self-localized network of transceivers can also execute other functions, such as localization of third-party transmitters or execution of high-data rate TDMA protocols. For example, the network can perform precise time-difference-of-arrival localization based on signals received from a third-party transmitter. In another example, the network can leverage the high degree of synchronicity between the network of transceivers to execute high data rate TDMA protocols by reducing buffer durations between slots in these protocols. However, the errors described above with respect to the pairwise frequency offset, time bias, and distance values may also negatively impact the accuracy of these applications of the mesh network. Conversely, by automatically correcting for these inaccuracies according to the method S100 the system can better compensate for inaccuracies on the transmitter side and improve localization and transmission of data via TDMA (e.g., by measuring the clock drift of transmitters relative to the mesh network of transceivers).

Therefore, the system can execute Blocks of the method S100 to identify, diagnose, and correct these errors in pairwise frequency-offset, time bias, and distance values between transceivers in the network by: scoring each transceiver based on a set of diagnostic tests; identifying particular transceivers based on these scores; and triggering the particular transceivers to recalibrate or resynchronize with other transceivers in the network and/or scheduling the particular transceivers for repair or replacement. Alternatively, the system can execute Blocks of the method S100 to: score each pairwise connection (i.e., a pairwise communication channel) between transceivers; identify particular problematic pairwise communication channels based on these scores; and identify an obstruction or anomaly within the communication channel that may be preventing accurate synchronization, syntonization, and/or distance calculation between transceivers associated with the identified communication channel.

More specifically, the system can access a network graph that includes: nodes, representing each transceiver; and edges, representing the pairwise communication channel between each pair of transceivers in the network. Furthermore, the network graph stores the position of each transceiver and the time bias of each transceiver relative to each other transceiver in the mesh network. By representing the mesh network via primarily relative measurements, the system obviates the need for a physical absolute time, frequency, or positional reference and enables construction of an abstract dynamic reference clock and set of relative locations that is more accurate and up-to-date compared to most readily available absolute timing and position references such as those available from mapping/floor plans or from the clock hardware on any individual transceiver. However, the system can also calculate time biases and/or locations relative to absolute reference clocks and/or absolute positional references.

The system can access a network graph including a set of edge values associated with the edges in the network graph. These edge values characterize current and/or historical states of the pairwise relationship between the two transceivers represented as nodes along the edge in the network graph. For example, edge values associated with edges in the network graph can include: the current pairwise time bias between the pair of transceivers represented by the nodes associated with the edge, the current pairwise frequency offset, the current pairwise distance, values representing the uncertainties associated with each of the aforementioned values, and/or time series of each of these aforementioned edge values characterizing the progression of the aforementioned values over time.

Likewise, the system can access a network graph including a set of node values associated with nodes in the network graph. These node values characterize current and/or historical states of the particular transceiver represented by each node in the network graph. For example, node values associated with nodes in the network graph can include: the current relative position of the transceiver represented by the node, the current relative time bias of the transceiver represented by the node, a current temperature value at the transceiver represented by the node, a current acceleration value at the transceiver represented by the node, a current barometric pressure value at the transceiver represented by the node, a global navigation satellite system (hereinafter "GNSS") location of the transceiver represented by the node, a GNSS time synchronization offset of the transceiver represented by the node, and/or time series of each of these aforementioned node values characterizing the progression of these aforementioned node values over time.

The system can then execute self-consistency tests, based on the network graph, for each fully connected group of three nodes (i.e., for each triangle graph) present in the current network graph; and score each node based on these self-consistency tests. The system can calculate higher scores to indicate a greater inaccuracy attributable to a node or an edge. Alternatively, the system can calculate lower scores to indicate a greater inaccuracy attributable to a node or an edge. However, for ease of explanation, the method S100 is described with respect to the implementation where high scores indicate greater inaccuracy.

In response to detecting that a score for an individual node is greater than a threshold score, the system can trigger the transceiver represented by the node to resynchronize and/or recalibrate with other transceivers in the network. In response to calculating consistently high scores for edges associated with a particular node over multiple iterations of the method S100 or over a period of time, the system can also trigger replacement of the transceiver represented by the particular node. Additionally or alternatively, the system can: score individual edges; identify particular edges with high scores; and prompt users/maintenance personnel of the system to investigate anomalies affecting the communication channel between transceivers represented by the nodes along the particular edge. Thus, the system can automatically identify, diagnose, and correct errors at transceivers in a decentralized mesh network of transceivers, thereby maintaining a nanosecond-level synchronization and sub-meter localization accuracy of the transceivers in the network.

While the network is accurately synchronized and frequency-calibrated, the frequency offset between a first transceiver and a second transceiver plus the frequency offset between the second transceiver and a third transceiver is equal to the frequency offset between the first transceiver and the third transceiver. Therefore, the system can leverage this transitivity of frequency offsets between transceivers to execute a frequency offset self-consistency test for each group of three fully connected nodes in the current network graph to evaluate the extent to which this transitivity holds true based on the reported pairwise frequency offset values from the network. The system can, for each group of three fully connected nodes in the network graph: subtract a first frequency offset represented by a first edge from the sum of a second frequency offset represented by a second edge, and a third frequency offset represented by a third edge; and calculate a frequency offset self-consistency score based on the value of this calculation.

Additionally, while the network is accurately synchronized and frequency-calibrated, the time bias between a first transceiver and a second transceiver plus the time bias between the second transceiver and a third transceiver is equal to the time bias between the first transceiver and the third transceiver. Therefore, the system can leverage this transitivity of time biases between transceivers to execute a time bias self-consistency test for each group of three fully connected nodes in the current network graph to evaluate the extent to which this transitivity holds true based on the reported pairwise time bias values from the network. The system can, for any group of three nodes in the network graph: subtract a first time bias represented by a first edge from the sum of a second time bias represented by a second edge, and a third time bias represented by a third edge; and calculate a time bias self-consistency score based on the value of this calculation.

Furthermore, the sum of two sides of a triangle formed between three transceivers is always greater than the third side of the triangle based on the triangle inequality theorem. Therefore, the system can execute a distance self-consistency test for each group of three fully connected nodes in the current network graph by evaluating whether this triangle inequality holds true based on the reported pairwise distance values from the network. In response to determining that a triangle cannot be formed based on the pairwise distances represented by edges between a group of three nodes in the network graph, the system can calculate a triangle inequality score based on this result.

Upon calculating the frequency offset self-consistency score, the time bias self-consistency score, and/or the triangle inequality score for a group of three nodes, the system can calculate a component diagnostic score for each node in the group of three nodes based on these scores. Upon calculating a new component diagnostic score for each node in the group of three nodes, the system can combine this component diagnostic score with a cumulative diagnostic score for the node. The system can then repeat this testing and scoring process for each group of three fully connected nodes defined by the current network graph, thereby updating the cumulative diagnostic score of a node each time this node is included in the group of three nodes under test. Thus, even in a network with sparse connectivity, the system can use these algorithms to test local subsets of connected transceivers or estimate the network connectivity graph, all of which can then enhance the accuracy of the relative state even for sets of transceivers without a direct physical layer connection.

Once the system has tested and scored each triangle graph identified within the network graph, the system can identify nodes with cumulative diagnostic scores greater than a threshold and trigger the transceivers represented by these nodes to recalibrate and/or resynchronize. Alternatively, the system can rank the nodes based on their cumulative diagnostic scores and trigger the transceivers represented by a predetermined percentile of these nodes to recalibrate and/or resynchronize.

Conversely, the system can identify nodes and edges whose cumulative diagnostic scores are lower than the threshold diagnostic score and designate a dynamic list of verified nodes and/or verified edges. The system can then generate a reference time and reference location for the mesh network based on only the verified nodes and/or verified edges. Thus, the system generates a reference time and a reference location for the mesh network that exploits the dynamically changing network topology to increase the accuracy of this reference time and reference location. For example, by leveraging only verified nodes and/or edges in the mesh network the system can generate a reference time with sub-nanosecond timing accuracy and a reference location with sub-meter positional accuracy even for applications in which: the mesh network is highly distributed; and individual transceivers and/or communication channels may not meet the specifications of the mesh network (such as due to errors in time-offset synchronicity caused by wireless multipath, due to errors in frequency offset synchronicity or initial calibration caused by relative motion, or due to low timing/location precision caused by an unstable local oscillator reference).

The system can periodically execute the method S100 to test the accuracy of the transceivers in the network over time as the system updates the network graph based on pairwise frequency offsets, pairwise time biases, and pairwise distances reported by the network of transceivers. The system can also track the history of each node's diagnostic score, over multiple testing intervals, to identify trends in transceiver performance over time. Therefore, upon calculating repeatedly high cumulative diagnostic scores for a node, the system can trigger an operator of the network to repair the transceiver represented by the node or to replace the transceiver entirely.

In one variation, the system can execute a failure prediction model (e.g., a machine learning model), based on a network graph including time series of edge values and/or node values, in order to predict failure (defined based on cumulative diagnostic score) of nodes and/or edges in the network prior to a current network graph exhibiting a failure. In this variation, the system can train the failure prediction model to recognize patterns in node values and or edge values that are predictive of a future failure of one or more transceivers in the mesh network.

3. Network Graph

Generally, the system maintains and/or accesses a network graph that represents a set of transceivers configured in a mesh network in Block S110. The transceivers can establish pairwise "connections"—such as a radio-frequency communication channel, optical communication channel, or any other form of direct communication between transceivers—with other transceivers in the mesh network. The transceivers in the mesh network can execute a frequency calibration and a time synchronization protocol on a pairwise basis to calculate the frequency offset between the clocks of each pair of transceivers, the time bias between the docks of each pair of transceivers, and/or the distance between each pair of transceivers (e.g., based on the propagation delay between transceivers and the speed of the data in the communication medium). Based on these pairwise edge values, the system can calculate a reference time for the mesh network (in order to synchronize the docks of each transceiver to a common time) and the relative location of each transceiver in the mesh network.

The system can generate or access an abstraction (i.e. the network graph) of the mesh network based on these pairwise data in order to track the performance of the mesh network. The system can access a network graph including a set of nodes, where each node represents a transceiver in the mesh network, and a set of edges between the nodes, where each edge represents a connection between a pair of nodes of sufficient quality (e.g., signal-to-noise ratio) to obtain pairwise data for the pair of nodes. Thus, the system can access a network graph that defines a connected graph. However, the system can access network graphs that are not maximally connected (i.e. complete) graphs due to low signal-to-noise ratio (hereinafter "SNR") caused by environmental factors or physical dispersion of the nodes. For example, the mesh network can include a set of RF transceivers spread over a large geographic area or an area with physical obstructions. Therefore, various pairs of transceivers in the mesh network may not be able to execute the frequency offset calibration and time synchronization protocols due to an insufficient SNR for transmissions between the pair of transceivers and therefore the network graph does not include an edge between these transceivers.

Thus, in Block S110, the system can access a network graph including: a set of nodes, each node in the set of nodes representing a transceiver in the network; and a set of edges, each edge in the set of edges connecting a pair of nodes in the set of nodes and representing a communication channel between a pair of transceivers in the network of transceivers represented by the pair of nodes, the communication channel characterized by a signal-to-noise ratio greater than a threshold signal to noise ratio.

Additionally, the system can access and/or maintain a network state based on the network graph in order to characterize the state of the transceivers and the connections between them in the mesh network. More specifically, the network state includes edge values in association with each edge in the network graph and/or node values in association with each node in the network graph that represent aspects of the communication channel represented by the edge and/or the transceiver represented by the node respectively. Thus, in Block S120, the system can access a network state including: a set of edge values for the set of edges and a set of node values for the set of nodes.

In one implementation, in addition to accessing a current network state of the mesh network represented by the network graph, the system can access a time series of network states in Block S120. More specifically, the system can access a network state including: a time series of edge values for each edge in the set of edges; and/or a time series of node values for each node in the set of nodes. Thus, the system can identify trends in the edge values and node values characterizing the status of the network.

In another implementation, the system can access a set of edge properties and/or a set of node properties representing static characteristics of the node that are not subject to change. For example, the system can access a set of node properties including the type of hardware of the transceiver represented by the node. In another example, the system can access a set of edge properties including a predetermined line-of-sight distance between two static transceivers and/or a predetermined frequency of the communication channel represented by an edge.

3.1 Relative Time Bias

Generally, the system can access, from the network state, reported pairwise time biases between transceivers (e.g., from transceivers executing the time synchronization process) and reported pairwise frequency offsets (e.g., from transceivers executing the frequency offset calibration process) to calculate a reference time for the mesh network of transceivers. More specifically, the system can generate and maintain an abstraction of a reference clock that defines a reference clock frequency and reference time (e.g., an initial time from which subsequent times can be measured). In order to construct this abstraction, the system can execute the method S100 to select the most accurate clock from amongst the transceivers as a master clock in the mesh network. Alternatively, the system can calculate a weighted average of nominal clock frequencies and nominal reference times tracked by each transceiver in the set of verified transceivers and verified communication channels in the mesh network. The system can weigh each nominal clock frequency and/or reference time corresponding to a transceiver based on a history of diagnostic scores generated for that transceiver. For example, the system can weigh nominal clock frequency and/or nominal reference times for transceivers based on a running average, which can be a temporally weighted running average or windowed running average.

In one implementation in which the system generates the reference clock based on an unweighted average of transceiver clocks, the system can, upon generating the reference clock, calculate the time bias (i.e., the relative time bias) of each transceiver relative to the reference clock and store this value as a node value in association with a node representing the transceiver. Thus, in addition to representing conditions at each node, the set of node values can also represent the time bias of a node relative to the reference clock, which may be indicative of poor performance of the node relative to other nodes in the network.

In another implementation, the system can test each nominal clock frequency and nominal reference time from each transceiver in the mesh network and select the nominal clock frequency and nominal reference time that minimizes diagnostic errors across the network.

However, the system can establish a reference time and a reference clock frequency in any other way.

3.2 Relative Location

Generally, the system can calculate a location for each node relative to a reference location based on the pairwise distances between nodes in the set of edge values in the network graph. More specifically, the system can access location data for one or more transceivers represented by nodes in the network graph in order to position those transceivers within a reference coordinate system. Upon calculating the relative location of one transceiver in the network, the system can access the location of additional transceivers and/or orientation data for the same transceiver in order to orient the transceivers within a reference coordinate system. The system can then localize other transceivers within the network based on the pairwise distances calculated between these transceivers. Thus, the system can access a set of node values including a relative location estimate of a transceiver represented by a node and can compare this relative location estimate to other sources of location data for the transceiver, thereby identifying errors in relative location estimates that may be indicative of failure at the transceiver.

In one implementation, the system can access location and or orientation data for transceivers via secondary localization technologies executed at the transceiver. For example, the system can access reference location and/or reference orientation data via a GNSS receiver, via an ultrawideband localization protocol (hereinafter "UWB" localization protocol"), via a signal strength localization protocol, via an angle-of-arrival localization protocol, via a dead-reckoning or accelerometer-based localization protocol, via magnetometer-based orientation detection, and/or any other localization or orientation protocol. Alternatively, the system can access a reference location database including known installed locations and/or orientations of a subset of transceivers in order to anchor the subset of transceivers in the reference coordinate system. The system can then estimate the location of other transceivers relative to the subset of transceivers.

By accessing location estimates for each transceiver based on multiple available localization technologies, the system can estimate network localization performance at each transceiver and identify failure at particular transceivers within the network. Thus, the system can access node values for a node including: a relative location estimate of the transceiver represented by the node based on pairwise distances in the set of edge values; and a set of location estimates based on other localization technologies.

3.3 Environmental Map

Generally, the system can also store an environmental map, which is a representation of a physical environment surrounding the mesh network of transceivers. More specifically, the system can store the network graph as a 3D representation of the calculated positions of the transceivers in the mesh network and overlay a map of the environment, which may include the locations and orientations of obstructions—such as physical obstacles or barriers—or anomalies (e.g., in the near field RF environment) that prevent transceivers from communicating with each other, over the network graph. Additionally, the system can augment the environmental map based on sensor data retrieved from the mesh network of transceivers such as temperature data recorded at each node. In this example, the system can estimate the temperature in a region of the environmental map and predict temperature changes and a corresponding decrease in the accuracy of the pairwise time bias and/or propagation delays reported by transceivers in this region.

Furthermore, the system can update the environmental map by detecting anomalies in the environment based on errors attributed to pairwise connections between transceivers (as opposed to errors attributable to specific transceivers).

In one implementation, the system can store the environmental map relative to an absolute reference location or orientation. In this implementation, if one transceiver in the mesh network of transceivers is positioned in a known location relative to the environmental map, the system can transform the relative location of each transceiver to an absolute location of the transceiver based on the environmental map.

3.4 Node Properties

Generally, the system can also store and/or access, in association with the network graph, node properties (e.g., static node values) that represent known non-transient characteristics of the transceiver represented by each node in the network graph, such as: nominal clock frequency (prior to correction by the calculated frequency offset of the transceiver), oscillator type (e.g., crystal oscillator, atomic oscillator), type of crystal oscillator cut (e.g., AT, SC, BT, IT, FC), oscillator circuit type (e.g., ATCXO, CDXO, DTCXO, OCXO), levels of temperature or voltage control of the oscillator, atomic clock type (e.g., cesium, rubidium, hydrogen), antenna type of the transceiver, and/or any other hardware-related property of the transceiver. Based on the set of node properties of each node in the network graph, the system can correlate the specific properties of each node with a range of expected behaviors of the transceivers represented by the nodes. The system can then utilize these correlations to predict and/or identify failure of transceivers exhibiting behavior outside of this expected range. More specifically, the system can include the set of node properties in an input vector to a failure prediction model, along with the set of edge values, the set of node values, and/or the set of edge properties, in order to predict whether the current network state (and/or a time series of past network states) predicts failure of any transceivers in the network.

3.5 Edge Properties

Generally, the system can also store and/or access, in association with the network graph, edge properties (e.g., static edge values) that represent known non-transient characteristics of the communication channel represented by each edge in the network graph, such as: a known, static, line-of-sight distance between stationary transceivers associated with the edge, a known, static, number of line-of-sight obstructions between stationary transceivers associated with an edge, a predetermined frequency or frequency range of the communication channel represented by the edge, and/or a medium of the communication channel (e.g., radio frequency channel, a fiber optic cable communication channel). Based on the set of edge properties of each edge in the network graph, the system can correlate specific edge properties with a range of expected performance of the communication channels represented by each edge in the network graph. The system can then utilize these correlations to predict and/or identify failure of particular communication channels exhibiting performance levels outside of the expected range. More specifically, the system can include the set of node properties within an input vector for a failure prediction model, along with the set of node properties, the set of edge values, and/or the set of node values, in order to identify whether the current network state (and/or a time series of past network states) predicts failure of any transceivers or communication channels in the network (as is further described below).

3.6 Edge Values

Figure 4:
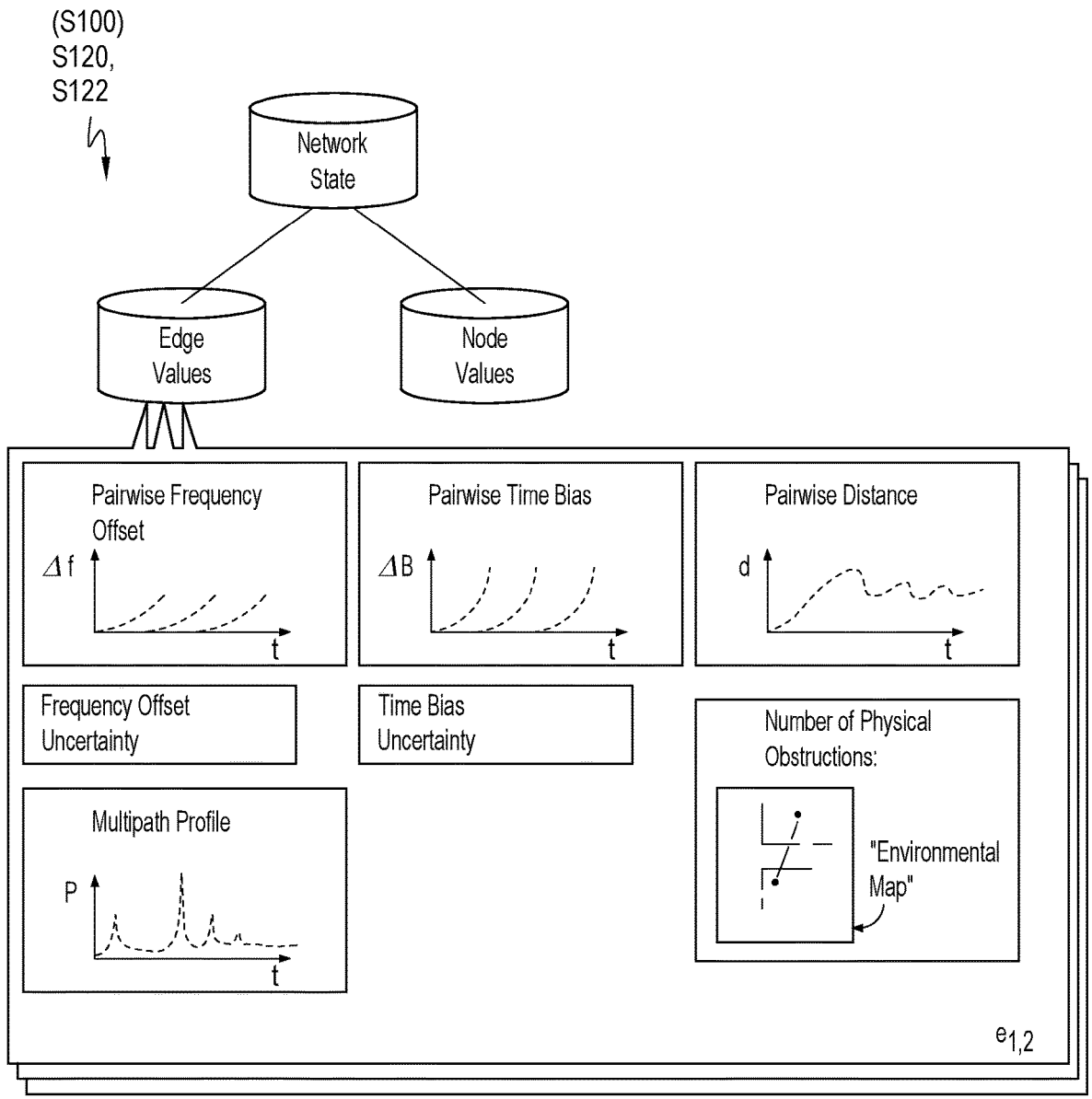
FIG. 4 is a flowchart representation of one variation of the method.
Figure 5:
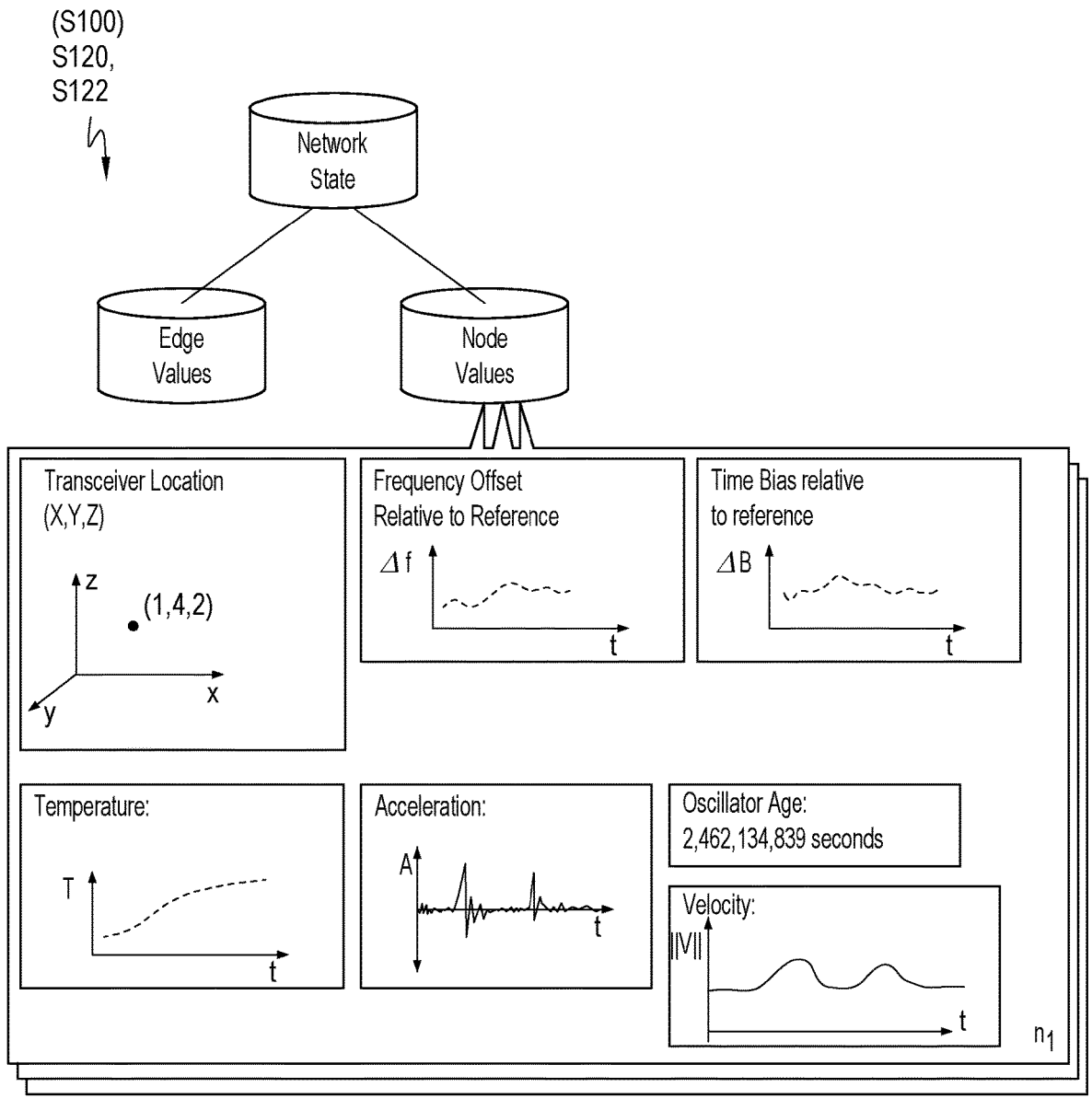
FIG. 5 is a flowchart representation of one variation of the method.

As shown in FIG. 4, the system can store a set of edge values in association with each edge in the network graph, where the edge represents a connection or communication channel between transceivers in the mesh network. More specifically, the system can access a network state including edge values including: any pairwise data generated by execution of the frequency offset calibration process and/or the time bias synchronization process by the pair of transceivers represented by the pair of nodes associated with the edge, such as the pairwise frequency offset between the transceivers associated with this pair of nodes, the pairwise time bias between transceivers associated with this pair of nodes, and the pairwise distance between transceivers associated with this pair of nodes. The system can also store edge values that represent characteristics of the connection between transceivers in the network represented by the pair of nodes associated with an edge, such as the SNR of the connection between these transceivers. Additionally or alternatively, the system can store, in the set of edge values, open-source band usage information within the operating band of the transceivers in the network. For example, the system can identify occupied frequency bands and, therefore, predict a level of interference on a communication channel represented by an edge in the network graph. Furthermore, the system can store a time series of these edge properties in order to track these properties over time.

As is further described below, the system can access a network state including: secondary edge values (e.g., a pairwise time bias), a pairwise frequency offset (e.g., crystal oscillator frequency offset), a pairwise distance, and uncertainty measures for these values; and/or primary edge values, such as a SNR, a multipath profile, and a number of physical obstructions. For example, the system can access a network state including, for each edge in the network graph or some subgraph of the network graph (e.g., a triangle graph): the pairwise time bias associated with the edge; a time bias uncertainty associated with the edge; the pairwise frequency offset associated the edge; a frequency offset uncertainty associated the edge; and a pairwise distance associated with the edge.

3.6.1 Pairwise Frequency Offset Calculation

Generally, assuming signal reception between a pair of transceivers in the mesh network, the pair of transceivers can execute a frequency offset calibration process to characterize relative frequency drift between clocks of the pair of transceivers. This frequency offset calibration process is detailed in U.S. patent application Ser. No. 16/588,722, which is incorporated in its entirety by reference. As a result of the frequency offset calibration process, each pair of transceivers can calculate to within a few parts-per-billion the frequency offset between their clocks. The system can then access the frequency offset for a pair of transceivers and associate this frequency offset data with an edge in the network graph representing the connection between the pair of transceivers. More specifically, the system can access a network state including a set of edge values for the set of edges including a set of pairwise frequency offsets in the network of transceivers.

However, the system can access the frequency offset between a pair of transceivers in any other way.

3.6.2 Pairwise Time Bias Calculation

Generally, assuming signal reception between a pair of transceivers in the mesh network, the pair of transceivers can execute a time bias synchronization process to characterize the relative time bias between clocks of the pair of transceivers. This process is detailed in U.S. patent application Ser. No. 16/405,922, which is incorporated in its entirety by reference. As a result of the time bias synchronization process, each pair of transceivers can calculate to within one nanosecond the time bias between the pair of transceivers. The system can then access the time bias for a pair of transceivers and associate this time bias with an edge in the network graph representing the connection between the pair of transceivers. More specifically, the system can access a network state including a set of edge values for the set of edge values, the set of edge values including a set of pairwise time biases in the network of transceivers.

However, the system can access the time bias between a pair of transceivers in any other way.

3.6.3 Pairwise Distance Calculation

Generally, assuming signal reception between a pair of transceivers in the mesh network, the pair of transceivers can execute the time bias synchronization process reference above to also characterize the propagation delay between the pair of transceivers. This process is detailed in U.S. patent application Ser. No. 16/405,922, which is incorporated in its entirety by reference. As a result of the time bias synchronization process, each pair of transceivers can calculate to within one nanosecond the propagation delay between the pair of transceivers and can, therefore, calculate the distance between the pair of transceivers based on the speed of data communication in the medium between these transceivers (e.g., the speed of light for RF and/or optical transmissions). The system can then access this propagation distance for a pair of transceivers and associate this propagation distance with an edge in the network graph representing the connection between the pair of transceivers. More specifically, the system can access the network state including the set of edge values for the set of edges, the set of edge values including a set of pairwise distances in the set of transceivers.

However, the system can access the propagation distance between a pair of transceivers in any other way.

3.6.4 Timing Uncertainty

Generally, in addition to calculating pairwise time bias, the system can access and/or measure the uncertainty of this time bias calculation in order to provide additional data characterizing the performance of transceivers in the network. More specifically, the system can access a network state including a set of edge values for the set of edges, the set of edge values including a time bias uncertainty associated with each edge in the set of edges. Thus, the system can identify network states indicating a high-uncertainty in the pairwise time bias between a pair of transceivers in the network and predict and/or identify failure of these transceivers.

In one implementation, the system can access a network state including measures of time bias uncertainty, such as: uncertainty due to the sampling frequency of the transceiver, measures of phase-of-arrival variability across subcarrier signals between transceivers, measures of phase-of-arrival variability across successive synchronization signals of variable carrier frequencies, measures of hybrid matched filter peak width, and/or any other measure of timing uncertainty, which may arise when executing time bias calculation as described in U.S. patent application Ser. No. 16/405,922.

In another implementation, the system can access a set of edge values including a pairwise distance uncertainty derived from a measure of timing uncertainty. The system can calculate a measure of pairwise distance uncertainty based on a measure of timing uncertainty because the pairwise propagation delay between transceivers (from which the distance between transceivers is calculated) is algebraically related to the pairwise time bias between transceivers, as described in further detail in U.S. patent application Ser. No. 16/405,922.

3.6.5 Frequency Offset Uncertainty

Generally, in addition to calculating the pairwise frequency offset between transceivers, the system can access and/or measure the uncertainty in this frequency offset calculation in order to further characterize the performance of transceivers in the network. More specifically, the system can access a network state including a set of edge values for the set of edges, the set of edge values including a frequency offset uncertainty associated with each edge in the set of edges. Thus, the system can identify network states in which the variability of frequency offsets has increased and predict and/or identify failure of transceivers based on the frequency offset uncertainty.

In one implementation, the system can access a network state including, for each edge in the network graph, a measure of frequency offset uncertainty, such as measure of calibration signal interval variability for a set of calibration signals sent between the pair of nodes (further described in U.S. patent application Ser. No. 16/405,922). In one example, the system can access a network state including a ratio of non-zero calibration signal interval deviations to calibration signal intervals equal to zero (i.e., the proportion of calibration signal interval deviations greater than zero) in a set of successive calibration signals. In this example, a lower value of this ratio indicates low uncertainty in the pairwise frequency offset associated with the same edge, while a higher value of this ratio indicates high uncertainty in the pairwise frequency offset associated with the same edge.

In another example, the system can access a network state including, for each edge in the network graph, a cumulative measure of the calibration signal interval deviation over a series of calibration signal intervals. In this example a higher cumulative deviation indicates greater uncertainty in the pairwise frequency offset associated with the same edge while a lower cumulative deviation indicates lower uncertainty in the pairwise frequency offset associated with the same edge.

3.6.6 Multipath Profile

Generally, the transceivers in the network can execute multipath profile detection methods on inbound synchronization signals or calibration signals and report a multipath profile for a communication channel represented by an edge. More specifically, the system can access a network state that includes a multipath profile associated with each edge in the set of edges. Thus, the system can calculate a level of uncertainty based on detected multipath components of the signal.

In one implementation, the system and/or transceivers in the network can execute the MUSIC algorithm on an inbound signal, as described in U.S. Provisional Application No. 63/105,822. In this implementation, the system can derive the relative timing, relative signal strength, and the specific number of multipath components. Thus, via inclusion of these multipath metrics in the set of edge values of the network state, the system can utilize the detected multipath severity of a communication channel to predict failure of transceivers transmitting over this communication channel.

3.6.7 Physical Obstructions

Generally, the system can access a set of edge values including a number of line-of-sight obstructions between two nodes based on the environmental map. More specifically, the system can access a network state that includes a number of line-of-sight obstructions associated with each edge in the set of edges based on a physical map and locations of each node relative to the physical map. Thus, the system can predict failure of one or more transceiver or communication channels between transceivers based on the number of physical obstructions between them. In this implementation, the system can include obstructions indicated on the environmental map along a communication channel in the number of obstructions metric. These obstructions can include walls, windows, floors (for three-dimensional maps), shelving, terrain, and/or any other objects known to affect radio frequency communication within the frequency band occupied by the communication channels utilized by the network of transceivers.

In one implementation, the system can access a detailed three-dimensional environmental map that represents the material and the thickness of obstructions between transceivers. The system can then generate a more accurate prediction regarding whether the obstructions are likely to cause a time synchronization or frequency calibration failure between transceivers.

4. Node Values Diagnostic Scoring

In one variation of the method S100, the system can predict, identify, and/or diagnose failures occurring at specific transceivers in the mesh network and/or along pairwise connections between transceivers in the mesh network by calculating set of consistency tests. More specifically, the system can execute a series of tests on groups of three connected nodes in the network graph in order to attribute the source of system-wide errors (e.g., localization errors and/or time synchronization errors) to particular nodes and/or edges in the network graph. The system can then calculate a component diagnostic score based on the set of tests and repeat this process for each group of three connected nodes in the network graph (i.e., each triangle graph in the network graph). Thus, the system can calculate a component diagnostic score (or a separate component score for each consistency test applied to the triangle graph) for each node or edge based on the number of groups of three nodes of which the node or edge is a member. The system can then calculate a cumulative sum or other cumulative function of the component diagnostic scores associated with each node or edge to calculate a cumulative diagnostic score for the node or edge. The system can then analyze these cumulative diagnostic scores to identify high cumulative diagnostic scores, which may indicate a greater contribution, to network-wide errors, of the transceiver or the connection between transceivers represented by the node or the edge respectively. Thus, the system can detect failure of particular transceivers and/or communication channels between transceivers based on a cumulative diagnostic score for a node or edge that exceeds a threshold cumulative diagnostic score. Alternatively, the system can identify local maxima of cumulative diagnostic scores across the nodes and edges included in the network graph in order to identify a root cause of time synchronization, frequency calibration, and/or distance calculation within the mesh network of transceivers.

4.1 Triangle Graph Identification

Generally, in order to calculate component diagnostic scores for particular nodes and/or edges in the network graph, the system can identify a set of (unique) unique triangle graphs within the network graph and calculate a component diagnostic score for the nodes and edges within each identified triangle graph. More specifically, the system can identify a set of triangle graphs based on the network graph in Block S130. For example, in a network graph of four fully connected nodes a, b, c, and d, the system can identify four groups of three nodes: a, b, and c; a, b, and d; a, c, and d; and b, c, and d. For network graphs that are not fully connected (e.g., not all of the transceivers in a network can establish a direct connection) the system can identify only groups of three nodes that are connected by three edges.

The system can identify triangle graphs from the network graph by executing a triangle counting algorithm—such as by computing an adjacency matrix representing the network graph, by executing a clustering coefficient algorithm, or by executing any triangle counting algorithm. Thus, by identifying triangle graphs in the network graph, the system can access subsets of the network state corresponding to the triangle graph in order to calculate component diagnostic scores for each edge and node of the triangle graph.

4.2 Subgraph Identification

In one variation, shown in FIG. 3, the system can identify subgraphs of other topologies (non-triangular subgraphs) associated with each node of the system instead of or in addition to identifying a set of triangle graphs. In this variation, instead of or in addition to executing the time bias self-consistency test, the frequency offset self-consistency test, and/or the triangle inequality self-consistency test, the system can execute a failure prediction model based on the network state of each identified subgraph in the network graph. More specifically, the system can, for each node in the network graph, identify a subgraph of the network graph associated with the node in Block S132. Thus, by identifying a subgraph associated with each node in the network graph, the system can reduce the size of the vector input to the failure prediction model (e.g., by including node values and edge values from only the subset of nodes in the network closely associated with a target node).

In one implementation, the system can identify a subset of nodes within a threshold number of edges from a target node based on the network graph. For example, the system can identify a subset of nodes within two degrees of separation (within two edges) of the target node and identify all edges between the subset of nodes in order to identify a subgraph associated with the particular node. Additionally, the system can identify a subset of nodes within some weighted edge distance from the target node based on an edge value or an edge property of each edge extending from the target node. More specifically, the system can identify a subset of nodes within a threshold edge distance of the target node in the network graph, such that the threshold edge distance is weighted by an edge value. For example, the system can calculate edge distance between nodes in the network graph weighted by the SNR of each edge, the pairwise distance of each edge, or any of the aforementioned edge values or edge properties of edges in the network graph. Thus, the system can limit the number of nodes and edges included in the subgraph to nodes and edges that are relevant to the target node.

In another implementation, the system can input the whole network state for the network graph into the failure prediction model, which, when executed by the system, outputs a cumulative diagnostic score for each node and/or each edge in the network graph. Thus, in this implementation, the system does not identify subgraphs—either of arbitrary or triangular topology—and instead interprets the network state as whole in order to predict failure at particular nodes and/or edges within the network graph.

4.3 Network State Access

In one implementation, upon identifying a subgraph or a triangle graph, the system can access a subset of edge values and/or a subset of node values in association with the subgraph or triangle graph in order to calculate a component diagnostic score for edges and/or nodes associated with the subgraph or triangle graph. More specifically, the system can access a network state of a subgraph including a subset of edge values for each edge in the subgraph and/or a subset of node values for each node in the subgraph in Block S122. For example, the system can access a subset of edge values, each edge in the subgraph including the pairwise time bias associated with each edge in the subgraph and a pairwise frequency offset associated with each edge in the first subgraph. Thus, the system can access edge values and/or node values relevant to the identified subgraphs of the network graph from the overall network state of the mesh network.

4.4 Component Scoring

Generally, the system can calculate a component diagnostic score based on a time-bias self-consistency test, a frequency offset self-consistency test, a triangle inequality self-consistency test, and/or the failure detection model, as executed based on a subset of edge values and/or a subset of node values associated with an identified subgraph of the network graph (e.g., a triangle graph or other subgraph topology). More specifically, the system can, for each triangle graph in the network graph, calculate the component diagnostic score based on: a subset of edge values in the set of edge values, the subset of edge values associated with the edges in the triangle graph; and a subset of node values in the set of node values, the subset of node values associated with nodes in the triangle graph in Block S140. Alternatively, the system can, for each identified subgraph of the network graph, calculate the component diagnostic score based on: a subset of edge values in the set of edge values, the subset of edge values associated with edges in the subgraph; and a subset of node values in the set of node values, the subset of node values associated with nodes in the subgraph. Thus, the system can iterate through each triangle graph or subgraph present within the network graph and calculate a component diagnostic score for each edge and/or each node included in the triangle graph or a target node of a subgraph.

4.4.1 Frequency Offset Self-Consistency Test

Generally, the system can execute a frequency offset self-consistency test on a triangle graph within the network graph. More specifically, the system can calculate a frequency offset self-consistency score based on a subset of pairwise frequency offsets in the set of pairwise frequency offsets, the subset of frequency offsets associated with the edges in the triangle graph. Thus, by calculating a frequency offset self-consistency score for each triangle graph identified within the network graph, the system can directly identify discrepancies between pairwise frequency offsets within the network of transceivers.

In one implementation, the system can: access a triangle graph; access, from the network state, the pairwise frequency offset values associated with edges of the triangle graph; and calculate frequency offset self-consistency score equal to a difference between a first pairwise frequency offset and a sum of a second pairwise frequency offset and a third pairwise frequency offset. Assuming accurate frequency calibration between the transceivers represented by the triangle graph, the system calculates a frequency offset self-consistency score of zero. However, if one or more of the transceivers represented by the triangle graph experience frequency calibration failures or experience crystal oscillator frequency drift, then the system calculates a non-zero frequency offset self-consistency score. Therefore, the system can correlate higher values of the frequency offset self-consistency score with a greater error in frequency offset calibration.

In order to calculate the frequency offset self-consistency score $\epsilon_f$, the system can solve the following equation of the form:

$$\epsilon_r = |\Delta f_{a,b} + \Delta f_{b,c} - \Delta f_{a,c}|,$$

where $\Delta f_{a,b}$ represents the pairwise frequency offset between transceiver a and b relative to a, which is stored in an edge between nodes representing transceivers a and b. Thus, the group of three transceivers represented by the group of three nodes is perfectly synchronized with respect to frequency, the system calculates a frequency offset self-consistency score equal to zero. However, a small nonzero value of the frequency offset self-consistency score is generally expected for any group of three nodes.

Furthermore, the system can calculate a frequency offset self-consistency score equal to any function of $\epsilon_f$.

4.4.2 Time Bias Test

Generally, the system can execute a time bias self-consistency test on a triangle graph identified within the network graph. More specifically, the system can calculate a time bias self-consistency score based on a subset of pairwise time biases in the set of pairwise time biases, wherein the subset of pairwise biases are associated with the edges in the triangle graph. Thus, by calculating a time bias self-consistency score for each triangle graph identified within the network graph, the system can directly identify discrepancies between pairwise time bias values in the network of transceivers.

In one implementation, the system can: access a triangle graph; access, from the network state a subset of pairwise time bias values, wherein the subset of pairwise time bias values are associated with edges of the triangle graph; and calculate time bias self-consistency score equal to a difference between a first pairwise time bias and a sum of a second pairwise time bias and a third pairwise time bias. Assuming accurate time synchronization between the transceiver represented by the triangle graph, the system calculates a time bias self-consistency score of zero. However, if one or more of the transceivers represented by the triangle graph experience clock drift and/or time synchronization failure, then the system calculates a non-zero time bias self-consistency score. Therefore, the system can correlate higher values of the time bias self-consistency score with greater error in time bias synchronization.

In order to calculate the time bias self-consistency score $\epsilon_b$, the system can solve the following equation of the form:

$$\epsilon_\beta = |\Delta\beta_{a,b} + \Delta\beta_{b,c} - \Delta\beta_{a,c}|,$$

where $\Delta\beta_{a,b}$ represents the pairwise time bias between transceiver a and b relative to a, which is stored in an edge between nodes representing transceivers a and b. Thus, the group of three transceivers represented by the group of three nodes is perfectly synchronized with respect to time, the system calculates a time bias self-consistency score equal to zero. However, a small nonzero value of the time bias self-consistency score is generally expected for any group of three nodes.

Furthermore, the system can calculate a time bias self-consistency score equal to any function of $\epsilon_\beta$.

4.4.3 Triangle Inequality Test

Generally, the system can execute a triangle inequality self-consistency test on a triangle graph within the network graph in order to test the accuracy of the pairwise distances between nodes represented by the triangle graph executing the time bias synchronization process. More specifically, the system can calculate a triangle inequality score based on a subset of pairwise distances in the set of pairwise distances, the subset of pairwise distances associated with the edges in the triangle graph. Thus, by calculating a triangle inequality self-consistency score, the system can identify geometric discrepancies between pairwise distance values in the network of transceivers and associate this discrepancy with a failure in time synchronization and/or frequency calibration of these transceivers.

In one implementation, the system can: access triangle graph; access, from the network state, a subset of pairwise distance values, wherein the subset of pairwise distance values are associated with edges of the triangle graph; and evaluate a triangle inequality to determine whether the distances between each of transceiver represented by the triangle graph can form a triangle. In one implementation, the system can provide a binary triangle inequality score indicating whether the set of nodes have failed the triangle inequality self-consistency test or passed the triangle inequality self-consistency test.

In order to evaluate the triangle inequality, the system can evaluate each of the following inequalities:

$$d_{ab} + d_{bc} > d_{ac},$$

$$d_{ab} + d_{ac} > d_{bc}, \text{ and}$$

$$d_{bc} + d_{ac} > d_{ab},$$

where $d_{ab}$ represents the distance between nodes a and b.

Additionally, the system can perform similar geometric comparisons between the pairwise distances represented by the current network graph and known distances between transceivers within the environmental map. For example, if a distance between two transceivers is known, the system can compare calculated distances between these two transceivers based on various groups of nodes representing other transceivers to evaluate the accuracy of the transceivers represented by the group of nodes.

In one implementation, instead of calculating a binary triangle inequality self-consistency score, the system can calculate a triangle inequality score based on the difference between the sum of the two shorter pairwise distances and the longest pairwise distance. Thus, in this alternative implementation, the system can output a continuous triangle inequality self-consistency score that represents the degree to which the edges in the triangle graph fail the triangle inequality self-consistency test.

4.5 Cumulative Diagnostic Scoring

Generally, because the system evaluates each of the above-described self-consistency tests on a triangle graph (as opposed to a single node), any component self-consistency score calculated for the triangle graph is equally relevant to the three nodes and three edges included in the triangle graph. In order to calculate an individual score of a target node (or edge) such that the system can identify failure of an individual transceiver or communication channel within the mesh network, the system can calculate a cumulative diagnostic score based on multiple component diagnostic scores calculated for triangle graphs of which a target node is a member.

For example, in a set of four fully connected nodes, a, b, c, and d, the system can identify four triangle graphs: a, b, and c; a, b, and d; a, c, and d; and b, c, and d. Therefore, in order to calculate a cumulative diagnostic score for node a, the system can combine the component diagnostic scores calculated for triangle graphs: a, b, and c; a, b, and d; and a, c, and d. Thus, the system can calculate a cumulative diagnostic score that is a combination of component diagnostic scores calculated for each unique triangle graph of which a target node and/or a target edge is a member.

4.5.1 Node Scoring

In one implementation, upon executing the frequency offset self-consistency test, the time bias self-consistency test, and/or the triangle inequality test for a triangle graph in the network graph, the system can combine the calculated frequency offset self-consistency score, the calculated time bias self-consistency score, and/or the calculated triangle inequality self-consistency score to calculate a component diagnostic score representing the error attributable to a target triangle graph and store this component diagnostic score in association with each of the three nodes in the triangle graph. More specifically, the system can, for each unique triangle graph in the network graph and for each node in each unique triangle graph, update the cumulative diagnostic score for the node based on the time bias self-consistency score, the frequency offset self-consistency score, and/or the triangle inequality self-consistency score in Block S150.

As the system executes the frequency offset self-consistency test, the time bias self-consistency test, and/or the triangle inequality test on each triangle graph in the network graph, the system can combine the calculated component diagnostic scores to calculate a cumulative diagnostic score for each node by adding (or otherwise combining) successively calculated component diagnostic scores for each triangle graph of which the node is a member. Therefore, by repeatedly testing the nodes in the network graph that are members of multiple triangle graphs, the system calculates higher cumulative diagnostic scores for nodes representing transceivers responsible for a larger number of errors in the mesh network.

In one implementation, the system can calculate multiple sets of component diagnostic scores and cumulative diagnostic scores, with each set of scores score corresponding to a different self-consistency test. For example, the system can calculate a frequency offset cumulative diagnostic score, a time bias cumulative diagnostic score, and a triangle inequality cumulative diagnostic score. By calculating separate diagnostic scores, the system can isolate causes of detected errors to the particular type of process that may not have been executed properly at each transceiver represented by each node.

In another implementation, the system can calculate a cumulative diagnostic score as a normalized sum of component diagnostic scores of a node. More specifically, the system can calculate a cumulative diagnostic score for a target node based on an average, or other measure of central tendency, of component diagnostic scores calculated for the target node. Thus, the system calculates cumulative diagnostic scores that are independent from the number of triangle graphs of which a target node is a member, thereby preventing nodes with many connections in the mesh network from receiving artificially high cumulative diagnostic scores.

4.5.2 Edge Scoring

In one implementation, upon executing the frequency offset self-consistency test, the time bias self-consistency test, and/or the triangle inequality test for a target triangle graph in the network graph, the system can combine the calculated frequency offset self-consistency score, the calculated time bias self-consistency score, and/or the calculated triangle inequality self-consistency score to calculate a component diagnostic score representing the error attributable to the target triangle graph and store this component diagnostic score in association with each of the three edges in the triangle graph. More specifically, the system can, for each unique triangle graph in the network graph and for each edge in each unique triangle graph, update the cumulative diagnostic score for the edge based on the time bias self-consistency score, the frequency offset self-consistency score, and/or the triangle inequality self-consistency score in Block S152.

As the system executes the frequency offset self-consistency test, the time bias self-consistency test, and/or the triangle inequality test on each triangle graph in the network graph, the system can combine the calculated component diagnostic scores to calculate a cumulative diagnostic score for each edge by adding (or otherwise combining) successively calculated component diagnostic scores for each triangle graph of which the edge is a member. Therefore, by repeatedly testing the edges in the network graph that are members of multiple triangle graphs, the system calculates higher cumulative diagnostic scores for edges representing communication channels responsible for a larger number of errors in the mesh network.

In one implementation, the system can calculate multiple component diagnostic scores and cumulative diagnostic scores, each cumulative score corresponding to a different self-consistency test. For example, the system can calculate a frequency offset cumulative diagnostic score, a time bias cumulative diagnostic score, and a distance-based cumulative diagnostic score. By calculating separate diagnostic scores, the system can isolate causes of detected errors to the particular type of signal being transmitted by transceivers over a communication channel represented by the target edge.

In another implementation, the system can calculate a cumulative diagnostic score as a normalized sum of component diagnostics scores of an edge. More specifically, the system can calculate a cumulative diagnostic score for a target edge based on an average, or other measure of central tendency, of component diagnostic scores calculated for the target edge. Thus, the system calculates cumulative diagnostic scores that are independent from the number of triangle graphs of which a target edge is a member, thereby preventing edges with many adjacent edges in the mesh network from receiving artificially high cumulative diagnostic scores.

4.6 Failure Prediction Model

Generally, the system can execute a failure prediction model on a subgraph of the network graph associated with a target node (or a target edge) in Block S170. More specifically, upon identifying a target subgraph associated with the target node (or edge) and accessing the network state associated with nodes and edges within this subgraph, the system can: generate an input vector comprising the subset of edge values associated with the target subgraph and the subset of node values associated with the target subgraph; and calculate a likelihood of failure of a transceiver represented by the target node within a threshold period of time based on the input vector and a failure prediction model. Thus, the system can execute a machine learning model in order to predict failure of a target transceiver (or target communication channel) based on a target network state of a target subgraph associated with the target transceiver (or target communication channel).

By predicting failure before failure is otherwise detectable via the aforementioned self-consistency tests, the system can execute preemptive corrective actions to maintain performance of the mesh network. For example, an increase in temperature around a transceiver in the mesh network concurrent with a small increase in the frequency offset self-consistency score associated with the transceiver may predict a future failure of a transceiver. In this example, the system can detect these otherwise unobservable signs of failure via the failure prediction model and execute corrective actions before performance of the mesh network degrades as a result of the imminent failure of the transceiver.

In one implementation, the system can generate an input vector for a target node that includes a current time bias self-consistency score of the target node, a current frequency offset self-consistency score of the target node, and/or a current triangle inequality self-consistency score. Thus, the system can predict a future failure as defined by these self-consistency scores based on the current value of these self-consistency scores. Additionally, the system can generate an input vector for a target node that includes a time series of time bias self-consistency scores of the target node, a time series of frequency offset self-consistency scores of the target node, and/or a time series of triangle inequality self-consistency scores of the target node.

In another implementation, the system can generate an input vector including a set of node values or a time series of node values associated with the target node and/or any other nodes included in the target subgraph associated with the target node. For example, the system can generate an input vector including a time series of temperature values at each transceiver represented in the subgraph, a time series of inertial data at each transceiver represented in the subgraph, and a time series of cumulative diagnostic scores of each transceiver represented in the subgraph. Thus, the system can utilize data from transceivers associated with the target transceiver to predict failure of the target transceiver before failure occurs at the target transceiver.

In yet another implementation, the system can generate an input vector including a set of edge values or a time series of edge values associated with edges connected to the target node and/or any other edges included in the target subgraph associated with the target node. For example, the system can generate an input vector including a multipath profile of each edge in the target subgraph, a number of physical obstructions of each edge in the target subgraph, a pairwise frequency offset of each edge in the target subgraph, an uncertainty of the pairwise frequency offset of each edge in the target subgraph, a pairwise time bias of each edge in the target subgraph, an uncertainty of the pairwise time bias of each edge in the target subgraph, a pairwise distance of each edge in the target subgraph, and/or an uncertainty of the pairwise distance of each edge in the target subgraph. Thus, the system can utilize data about communication channels between transceivers associated with the target transceiver to predict failure of the target transceiver before failure occurs at the target transceiver.

In yet another implementation, the system can generate an input vector to the failure prediction model that includes a set of node properties and/or a set of edge properties associated with the nodes and/or edges of the target subgraph respectively. Although the node properties and/or edge properties are non-transient properties of the transceivers and/or communication channels represented by the nodes and/or edges of the subgraph, the system can still include these node properties and/or edge properties to provide additional context to the failure prediction model.

Generally, the system can execute a failure prediction model implemented as a machine learning model such as an artificial recurrent neural network or a long short-term memory neural network that receives, as input, the input vector generated by the system and outputs a likelihood of failure if a particular target node or on each of the nodes within the network graph. More specifically, the system can execute the failure prediction model to generate a likelihood of failure for a target node or to generate an output vector including a likelihood of failure of each node in the network graph.

In one implementation, the system can: execute the failure prediction model on a target subgraph of the network graph associated with a target node; and output a likelihood of failure of the target node. Therefore, in this implementation, the system executes the failure prediction model once for each node in the network graph. Alternatively, the system can: generate an input vector for the network graph (e.g., the whole network graph or some subgraph of interest within the network graph); execute the failure prediction model on the input vector; and generate an output vector that includes a likelihood of failure for each node in the network graph.

Although the failure prediction model is described above with respect to a target node, the system can also execute the failure prediction model based on a target edge and a target subgraph associated with the target edge. In this implementation, the system executes a failure prevention model and outputs the likelihood of a communication anomaly developing along the communication channel represented by the target edge within a threshold period of time.

4.6.1 Training

Generally, the system, or a cooperative computer system, can train the failure prediction model based on training examples that include historical network graphs in addition to historical edge values and node values associated with the historical network graph captured during normal operation under a range of workloads/use cases of the mesh network. Each training example captures a moment in time and can include a topology of the historical network graph, a set of current edge values for the historical network graph, a set of current node values of the historical network graph, a time series of edge values preceding the current state of the historical network graph, and/or a time series of node values preceding the current state of the historical network graph. Thus, each training example represents a snapshot of a historical mesh network at a particular time and includes data available to the system at that particular time. Additionally, each training example is labelled according to the status (either "failure" or "continued operation") of one or more transceivers in the historical mesh network after the threshold period of time for failure detection (e.g., ten seconds, one minute, five minutes). For example, the training example can include a status for each node in the historical mesh network five minutes from the current time of the training example and can include a time series of edge values and a time series of node values preceding the particular time.

Generally, the system can label training examples based on historical data as a failure for a particular transceiver within the historical mesh network in response to the cumulative diagnostic score of the particular transceiver having exceeded a threshold score. Alternatively, the system can label failures of transceivers via any other means. Thus, the system can distinguish training examples of transceiver failure from training examples exhibiting proper functioning of transceivers in the mesh network.

In one implementation, the system can generate a large number of training examples from a historical data set by generating a training example for each time step in the time series of node values and edge values associated with an associated historical network graph. For example, the system can generate a training example for each one second interval in a historical data set associated with a historical network graph. Thus, the system can extract a multitude of training examples based on a limited number of historical data sets for mesh networks.

Upon generating a set of training examples, the system can then execute a supervised learning algorithm to train the failure prediction model based on the training examples. Thus, the system can train an accurate failure prediction model based on historical data from prior mesh network implementations.

Although generation of training examples is described above with respect to the status of particular nodes in the historical network graph, the system can also generate training examples that are labeled according to the failure of communication channels represented by edges in the historical network graph. Thus, the system can train the failure prediction model to calculate a likelihood of a communication anomaly developing along the communication channel represented by an edge within a threshold period of time.

5. Correction Triggers

Upon calculating a cumulative diagnostic score or likelihood of failure for a node in a network, the system can trigger a corrective action at the transceiver in the mesh network based on the cumulative diagnostic score or likelihood of failure of the node. More specifically, the system can, in response to detecting a cumulative diagnostic score for a target node that exceeds a threshold cumulative diagnostic score, trigger a corrective action at a target transceiver represented by the target node in Block S160. Additionally or alternatively, the system can, in response to detecting a first cumulative diagnostic score for a first edge exceeding a first threshold cumulative diagnostic score, trigger a first corrective action at a first communication channel represented by the first edge in Block S162. In another alternative implementation, the system can, in response to detecting a likelihood of failure of a target node representing a target transceiver exceeding a threshold likelihood, trigger a corrective action at the target transceiver in Block S164. In yet another alternative implementation, the system can, in response to detecting a likelihood of failure of a target edge representing a target communication channel exceeding a threshold likelihood, trigger a corrective action at the target communication channel. Thus, the system can trigger corrective actions at transceivers and/or communication channels between transceivers based on either a current cumulative diagnostic score of a node or edge, or based on a likelihood of failure of a node or edge.

5.1.1 Threshold Triggers

In one implementation, the system can: establish a threshold diagnostic score; and, in response to a cumulative diagnostic score of a node exceeding the threshold diagnostic score, trigger the transceiver associated with the node to recalibrate (i.e. execute a frequency offset calibration process) or resynchronize (i.e. execute the time synchronization process) with other nodes in the mesh network. In one implementation, in response to a cumulative diagnostic score of an edge exceeding the threshold diagnostic score, the system can trigger transceivers represented by the nodes associated with the edge to recalibrate and/or resynchronize.

In another implementation, the system can establish separate diagnostic score thresholds for each separate type of cumulative diagnostic score calculated by the system. For example, the system can calculate a frequency offset cumulative diagnostic score, a time bias cumulative diagnostic score, and a triangle inequality cumulative diagnostic score, and store each of these in association with each node and edge in the network. The system can then compare each type of cumulative diagnostic score to a corresponding threshold diagnostic score. The system can then trigger specific actions by the transceivers based on the type of cumulative diagnostic score that exceeds the threshold diagnostic score.

5.1.2 Proportional Triggers

In another implementation, instead of triggering corrective actions based on thresholds, the system can: identify particular nodes and/or edges characterized by a high cumulative diagnostic score or a high likelihood of failure; and trigger corrective actions to improve the functionality of the transceiver or communication channel represented by the node or edge. In one implementation, the system can rank the nodes and/or edges from the node and/or edge with the highest cumulative diagnostic score or likelihood of failure to the node and/or edge with the lowest cumulative diagnostic score or likelihood of failure. The system can then trigger corrective actions at a threshold number or threshold proportion of highest ranked transceivers represented by these nodes and/or associated with these edges to prevent or recover from failure identified at these transceivers. For example, the system can trigger corrective actions at five transceivers represented by the five nodes characterized by the highest cumulative diagnostic score or likelihood of failure. In another example, the system can trigger corrective actions at a ninety-fifth percentile of transceivers with the highest cumulative diagnostic scores and/or likelihoods of failure in the mesh network.

5.1.3 Local Maxima Detection

In yet another implementation, the system can: identify nodes and/or edges characterized with a cumulative diagnostic score or a likelihood of failure that represents a local maximum within the network graph. More specifically, the system can, in response to detecting a local maximum cumulative diagnostic score in the network graph, trigger a corrective action at the transceiver represented by the node at the local maximum. Alternatively, the system can, in response to detecting a local maximum likelihood of failure in the network graph, trigger a corrective action at the transceiver represented by the node at the local maximum. Likewise, in response to detecting a local maximum of cumulative diagnostic scores or likelihoods of failure at an edge within the network graph, the system can trigger corrective actions at transceivers represented by nodes connected via the identified edge.

5.2 Corrective Actions

Generally, upon identifying and/or failure of a transceiver or communication channel within the mesh network, the system can trigger a corrective action or a set of corrective actions in order to return the transceiver and/or communication channel that has been identified as failing or predicted to fail to normal operation. More specifically, the system can execute automated corrective actions such as frequency recalibration or time resynchronization at a target transceiver or a set of target transceivers (e.g., a set of target transceivers associated with a target communication channel). Alternatively, the system can prompt operators of the mesh network of the transceivers to perform a replacement of specific hardware at a target transceiver in the mesh network. Thus, the system can remedy failures or predicted failures in order to return the mesh network to normal operation 5.2.1 Frequency Recalibration Generally, the system can, in response to identifying or predicting failure of a transceiver or communication channel, trigger frequency recalibration of a target transceiver or a set of target transceivers. In one implementation, the system can, in response to detecting a cumulative diagnostic score for a target node exceeding the threshold cumulative diagnostic score, trigger resyntonization (i.e., frequency recalibration) of a target transceiver represented by the target node. Alternatively, the system can, in response to calculating a likelihood of failure of a target transceiver exceeding a threshold likelihood of failure, trigger resyntonization of the target transceiver.

In another implementation, the system can: calculate a frequency offset cumulative diagnostic score for a node; and, in response to the frequency offset cumulative diagnostic score exceeding a threshold frequency offset diagnostic score, trigger the transceiver represented by the node to execute a frequency offset calibration process. The system can evaluate the nodes and/or edges based on the frequency offset diagnostic score prior to evaluating the nodes based on the time bias diagnostic score or the triangle inequality diagnostic score due to the relationship between the frequency offset calibration process and the time bias synchronization process. Because the time bias synchronization process can occur after accurate frequency offset calibration has occurred between two transceivers, the system can prioritize errors detected in the frequency offset between nodes.

In yet another implementation, in response to detecting failure or predicting failure at a transceiver in the mesh network, the system can trigger frequency recalibration between the transceiver and each connected transceiver within the mesh network. Alternatively, in response to detecting failure or predicting failure of a communication channel in the mesh network, the system can trigger the pair of transceivers associated with the communication channel to execute frequency recalibration.

5.2.2 Time Bias Resynchronization

Generally, the system can, in response to detecting or predicting failure of a transceiver or communication channel in the mesh network, trigger time bias resynchronization of a target transceiver or set of target transceivers. In one implementation, the system can, in response to detecting a cumulative diagnostic score for the target node exceeding the threshold cumulative diagnostic score, trigger resynchronization of a target transceiver represented by the target node. Alternatively, the system can, in response to predicting failure of a target transceiver, trigger a resynchronization of the target transceiver in the mesh network.

In another implementation, the system can: calculate a time bias cumulative diagnostic score for a node and/or edge in the network graph; and, in response to the time bias cumulative diagnostic score exceeding a threshold time bias diagnostic score, the system can trigger the transceiver represented by the node to execute the time bias resynchronization process. Additionally, the system can: calculate a triangle inequality cumulative diagnostic score for a node and/or edge in the network graph; and, in response to the triangle inequality cumulative diagnostic score exceeding a threshold triangle inequality diagnostic score, the system can trigger the transceiver represented by the node to execute a time bias synchronization process. Because the time bias synchronization process provides both a time bias between two transceivers and a distance between transceivers, the system can trigger a transceiver to resynchronize in response to errors in the distance between nodes or the time bias between nodes.

In yet another implementation, the system can, in response to detecting or predicting failure of a transceiver in the mesh network, trigger time bias resynchronization between the transceiver and each connected transceiver in the mesh network (on a pairwise basis). Alternatively, in response to detecting or predicting failure, of a communication channel in the mesh network, the system can trigger time bias resynchronization of the pair of transceivers associated with the communication channel.

5.2.3 Hardware Reset or Replacement

Generally, in response to detecting repetitive failure of a transceiver or communication channel in the mesh network, the system can prompt an operator of the mesh network to execute a hardware reset or replacement at the transceiver. For example, the system can prompt an operator of the mesh network to replace the timing circuit of the transceiver or the crystal oscillator of the transceiver in order to improve performance of the transceiver in accurately calculating time bias, frequency offset, and distance with other transceivers in the mesh network.

In one implementation, the system can, in response to detecting a cumulative diagnostic score for a target node exceeding the threshold cumulative diagnostic score, trigger hardware replacement of a target transceiver represented by the target node. In another implementation, the system can track diagnostic scores for a node over multiple iterations of the method S100; and, in response to calculating a running average diagnostic score greater than a threshold running average diagnostic score for the node, the system can trigger an operator of the mesh network to replace or physically repair a transceiver corresponding to the node. The system can provide information to the operator regarding the types of errors that triggered the trigger.

5.2.4 Anomaly Detection

Generally, in response to detecting or predicting failure of a communication channel in the mesh network, the system can: detect an anomaly in the near field environment and prompt an operator of the mesh network to investigate the anomaly. For example, the system can prompt an operator to remove large metal objects or other obstructions in the vicinity of either transceiver associated with the failed communication channel. Thus, the system can aid operators of the mesh network in identifying potential causes of failure of communication channels in the mesh network.

In one implementation, the system can track diagnostic scores for an edge over multiple iterations of the method S100; and in response to calculating a running average diagnostic score greater than a threshold running average diagnostic score for the edge, the system can identify an anomaly in the near field RF environment that may be causing repeated errors in the connection between two transceivers represented by the edge.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
    accessing a network graph comprising:
        a set of nodes, each node in the set of nodes representing a transceiver in a network of transceivers; and
        a set of edges, each edge in the set of edges:
            connecting two nodes in the set of nodes; and
            representing a communication channel between a pair of transceivers in the network of transceivers represented by the pair of nodes;
    accessing a network state comprising a set of edge values for the set of edges;
    identifying a set of triangle graphs in the network graph;
    for each triangle graph in the network graph:
        calculating a component diagnostic score based on a subset of edge values in the set of edge values, the subset of edge values associated with edges in the triangle graph; and
        for each node in the triangle graph, updating a cumulative diagnostic score for the node based on the component diagnostic score; and
    in response to detecting a first cumulative diagnostic score for a first node exceeding a threshold cumulative diagnostic score, triggering a corrective action at a first transceiver represented by the first node.

2. The method of claim 1:
    wherein accessing the network state comprises accessing the network state comprising the set of edge values for the set of edges, the set of edge values comprising a set of pairwise time biases in the network of transceivers;
    wherein calculating the component diagnostic score based on the subset of edge values comprises calculating a time bias self-consistency score based on a subset of pairwise time biases in the set of pairwise time biases, the subset of pairwise time biases associated with the edges in the triangle graph; and
    wherein updating the cumulative diagnostic score for the node based on the component diagnostic score comprises, for each node in the triangle graph, updating the cumulative diagnostic score for the node based on the time bias self-consistency score.

3. The method of claim 1:
    wherein accessing the network state comprises accessing the network state comprising the set of edge values for the set of edges, the set of edge values comprising a set of pairwise frequency offsets in the network of transceivers;
    wherein calculating the component diagnostic score based on the subset of edge values comprises calculating a frequency offset self-consistency score based on a subset of frequency offsets in the set of frequency offsets, the subset of frequency offsets associated with the edges in the triangle graph; and
    wherein updating the cumulative diagnostic score for the node based on the component diagnostic score comprises, for each node in the triangle graph, updating the cumulative diagnostic score for the node based on the frequency offset self-consistency score.

4. The method of claim 1:
    wherein accessing the network state comprises accessing the network state comprising the set of edge values for the set of edges, the set of edge values comprising a set of pairwise distances in the set of transceivers;
    wherein calculating the component diagnostic score based on the subset of edge values comprises calculating a triangle inequality score based on a subset of pairwise distances in the set of pairwise distances, the subset of pairwise distances associated with the edges in the triangle graph; and
    wherein updating the cumulative diagnostic score for the node based on the component diagnostic score comprises, for each node in the triangle graph, updating the cumulative diagnostic score for the node based on the triangle inequality score.

5. The method of claim 1, wherein accessing the network state comprising the set of edge values for the set of edges comprises accessing the network state comprising a number of line-of-sight obstructions associated with each edge in the set of edges based on a physical map and locations of each node relative to the physical map.

6. The method of claim 1:
    wherein accessing the network state comprising the set of edge values for the set of edges comprises accessing the network state comprising:
        the set of edge values for the set of edges; and
        a set of node values for the set of nodes; and
    wherein calculating the component diagnostic score based on the subset of edge values comprises calculating the component diagnostic score based on:
        the subset of edge values in the set of edge values, the subset of edge values associated with the edges in the triangle graph; and
        a subset of node values in the set of node values, the subset of node values associated with nodes in the triangle graph.

7. The method of claim 6, wherein accessing the network state comprising the set of edge values for the set of edges comprises accessing the network state comprising a multipath profile associated with each edge in the set of edges.

8. The method of claim 6, wherein accessing the network state comprising the set of edge values for the set of edges comprises accessing the network state comprising a time bias uncertainty associated with each edge in the set of edges.

9. The method of claim 6:
    wherein accessing the network state comprises accessing the network state comprising:
        the set of edge values for the set of edges, the set of edge values comprising a time series of edge values; and
        the set of node values for the set of nodes, the set of node values comprising a time series of node values; and
    wherein calculating the component diagnostic score comprises:
        generating an input vector comprising the subset of edge values in the set of edge values and the subset of node values in the set of node values;
        calculating a likelihood of failure of a transceiver represented by the triangle graph within a threshold period of time based on the input vector and a failure prediction model; and
        calculating the component diagnostic score based on the likelihood of failure.

10. The method of claim 9, wherein accessing the network state comprises accessing the network state comprising:

the set of edge values for the set of edges, the set of edge values comprising a time series of edge values; and the set of node values for the set of nodes, the set of node values comprising a time series of node values comprising a time series of temperature values associated with each node in the set of nodes.

11. The method of claim 9, wherein accessing the network state comprises accessing the network state comprising:

the set of edge values for the set of edges, the set of edge values comprising a time series of edge values; and the set of node values for the set of nodes, the set of node values comprising a time series of node values comprising a time series of accelerometer values associated with each node in the set of nodes.

12. The method of claim 1, wherein accessing the network graph comprises accessing the network graph comprising:

the set of nodes; and the set of edges, each edge in the set of edges:
 connecting a pair of nodes in the set of nodes; and
 representing a communication channel between a pair of transceivers in the network of transceivers represented by the pair of nodes, the communication channel characterized by a signal-to-noise ratio greater than a threshold signal to noise ratio.

13. The method of claim 1, wherein triggering the corrective action at the first transceiver represented by the first node comprises, in response to detecting the first cumulative diagnostic score for the first node exceeding the threshold cumulative diagnostic score, triggering resynchronization of a first transceiver represented by the first node.

14. The method of claim 1, wherein triggering the corrective action at the first transceiver represented by the first node comprises, in response to detecting the first cumulative diagnostic score for the first node exceeding the threshold cumulative diagnostic score, triggering resyntonization of a first transceiver represented by the first node.

15. The method of claim 1, wherein triggering the corrective action at the first transceiver represented by the first node comprises, in response to detecting the first cumulative diagnostic score for the first node exceeding the threshold cumulative diagnostic score, triggering hardware replacement of a first transceiver represented by the first node.

16. A method comprising:

accessing a network graph comprising:
 a set of nodes, each node in the set of nodes representing a transceiver in a network of transceivers; and
 a set of edges, each edge in the set of edges:
  connecting a pair of nodes in the set of nodes; and
  representing a communication channel between a pair of transceivers in the network of transceivers represented by the pair of nodes;

accessing a network state comprising a set of edge values for the set of edges;

identifying a set of triangle graphs in the network graph, each triangle graph comprising three nodes in the set of nodes connected by three edges in the set of edges;

for each triangle graph in the network graph:
 calculating a component diagnostic score based on a subset of edge values in the set of edge values, the subset of edge values associated with edges in the triangle graph; and
 for each edge in the triangle graph, updating a cumulative diagnostic score for the edge based on the component diagnostic score; and in response to detecting a first cumulative diagnostic score for a first edge exceeding a first threshold cumulative diagnostic score, triggering a first corrective action at a first communication channel represented by the first edge.

17. The method of claim 16, further comprising:

for each triangle graph in the network graph:
 for each node in the triangle graph, updating a cumulative diagnostic score for the node based on the component diagnostic score; and in response to detecting a second cumulative diagnostic score for a second node exceeding the threshold cumulative diagnostic score, triggering a second corrective action at a second transceiver represented by the second node.

18. The method of claim 16, further comprising:

for each triangle graph in the network graph:
 for each node in the triangle graph, updating a cumulative diagnostic score for the node based on the component diagnostic score; and in response to detecting a local maximum cumulative diagnostic score in the network graph, triggering a second corrective action at the local maximum.

19. A method comprising:

accessing a network, the network graph comprising:
 a set of nodes, each node in the set of nodes representing a transceiver in a network of transceivers; and
 a set of edges, each edge in the set of edges:
  connecting a pair of nodes in the set of nodes; and
  representing a communication channel between a pair of transceivers in the network of transceivers represented by the pair of nodes;

identifying a first subgraph of the network graph associated with a first node in the set of nodes, the first node representing a first transceiver;

accessing a first network state of the first subgraph comprising a set of edge values for each edge in the first subgraph, the set of edge values comprising a pairwise time bias associated with each edge in the subgraph and a pairwise frequency offset associated with each edge in the first subgraph;

calculating a first likelihood of failure of the first transceiver within a threshold period of time based on the first network state of the first subgraph and a failure prediction model; and in response to detecting the first likelihood of failure of the first transceiver exceeding a threshold likelihood, triggering a corrective action at the first transceiver.

20. The method of claim 19, wherein accessing the first network state of the first subgraph comprises accessing the first network state of the first subgraph comprising:

the set of edge values for each edge in the first subgraph comprising:
 the pairwise time bias associated with each edge in the subgraph;
 a time bias uncertainty associated with each edge in the subgraph;
 the pairwise frequency offset associated with each edge in the subgraph;
 a frequency offset uncertainty associated with each edge in the subgraph; and
 a pairwise distance associated with each edge in the subgraph; and a set of node values for each node in the first subgraph comprising:
 a temperature series associated with each node in the first subgraph; and an acceleration series associated with each node in the first subgraph.

* * * * *